(No Model.)

A. C. LATTA.
VELOCIPEDE.

No. 428,919. Patented May 27, 1890.

Witnesses:
Chas. J. Buchheit
Theo. L. Popp

Adrian C. Latta  Inventor
By Wilhelm Bonner
Attorneys.

UNITED STATES PATENT OFFICE.

ADRIAN C. LATTA, OF FRIENDSHIP, NEW YORK.

VELOCIPEDE.

SPECIFICATION forming part of Letters Patent No. 428,919, dated May 27, 1890.

Application filed October 5, 1887. Serial No. 251,508. (No model.)

*To all whom it may concern:*

Be it known that I, ADRIAN C. LATTA, of Friendship, in the county of Allegany and State of New York, have invented new and useful Improvements in Velocipedes, of which the following is a specification.

The object of this invention is to produce a simple bearing for the axles and pedals of a velocipede, which combines a plain bearing with a ball or roller bearing, so that either bearing can be used at desire, and so that when the ball-bearing becomes inoperative or impaired by wear or otherwise the plain bearing will be brought into use, thereby extending the life of the bearing and rendering the machine more convenient and reliable in use.

Figure 1:
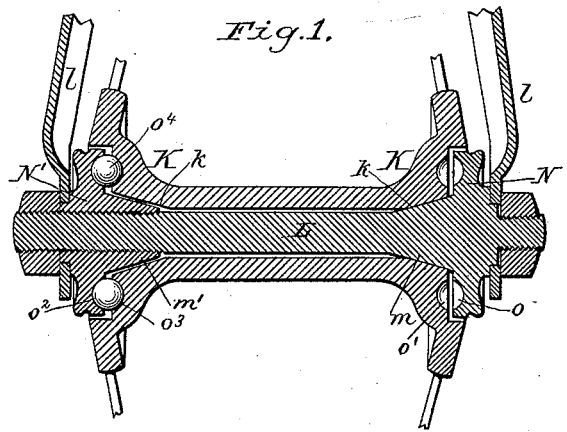
Figure 2:
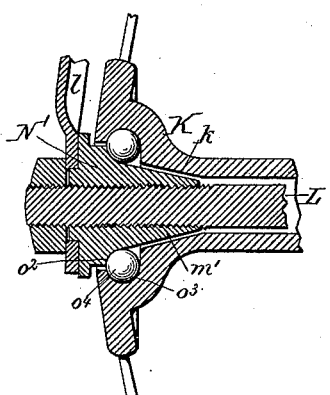
Figure 3:
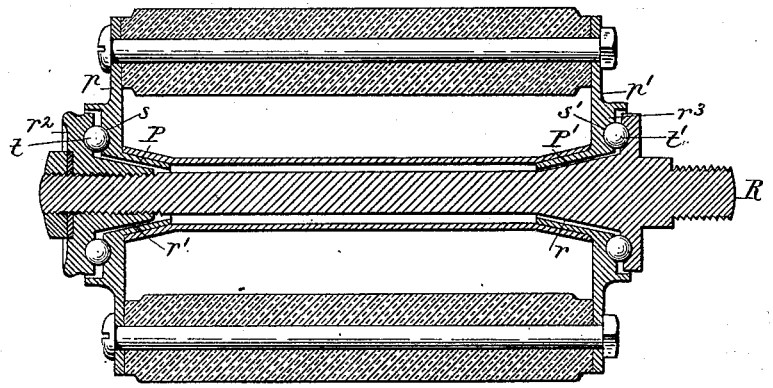

In the accompanying drawings, Figure 1 is a fragmentary cross-section of the rear wheel of a velocipede provided with my improvements. Fig. 2 is a fragmentary sectional view showing a modified construction of the bearing. Fig. 3 is a longitudinal section of a pedal provided with my improvements.

Like letters of reference refer to like parts in the several figures.

Referring to Fig. 1, K represents the hub of the wheel, provided at both ends of its bore with plain conical bearing-surfaces $k$, which flare outwardly.

L represents the fixed spindle or axle secured to the fork by clamping-nuts applied to the screw-threaded ends of the spindle and bearing against the outer sides of the fork-arms. The spindle L is provided near one end with a plain tapering bearing face or cone $m$, secured to or formed integral with the spindle.

N is a flange or collar surrounding the large end of the cone $m$, and provided on its inner side with an annular groove $o$. The hub K is provided in its adjacent end with a similar groove $o'$, arranged opposite the groove of the collar N. The balls, which are seated in these grooves when the ball-bearings are used, are not represented in the drawings.

$m'$ represents a cone mounted adjustably on the spindle L and having an internal screw-thread, which engages with the adjacent externally-threaded portion of the spindle. The cone $m'$ is provided with a collar N', having on its inner side an annular groove $o^2$, which stands opposite a similar groove $o^3$, formed in the adjacent end of the hub.

$o^4$ represents the balls arranged in the grooves $o^2$ $o^3$. Any wear of the parts may be taken up by adjusting the cone $m'$.

The depth of the ball-grooves is somewhat less than the radius of the balls, so that a small space is left between the collars of the spindle and the ends of the latter, which permits the requisite adjustment of the bearings.

The conical or tapering bearing-surfaces of the hub and spindle are arranged so far apart that they clear each other when the balls are in their normal working condition, but at the same time so near together that they will come in operative contact when the ball-grooves have become worn to such an extent as to impair the operation of the bearing. If desired, the balls may be removed when the ball-bearings have become worn so far as to allow the plain bearings to come into operation; but I prefer to leave the balls in the bearing, as they will still receive a large part of the wear, and thereby reduce the wear of the plain bearings.

In the left-hand side of Fig. 1 the balls are shown in place and the plain bearings separated, while in the right-hand side of the figure the balls are removed and the plain bearings are shown in operative contact.

My improved ball-bearings will wear as long as the anti-friction bearings now in use, and when the ball-bearings become impaired or inoperative the plain bearings will wear longer than those heretofore employed.

An important feature of this construction is that in the event of any of the balls being lost or broken the plain bearings can be used until it is convenient to replace the balls.

Fig. 2 shows a slight modification of the bearing, the ball-grooves being undercut in the hub and the cone being provided with a concave shoulder, against which the balls rest.

In the modified construction illustrated in Fig. 3, my improvements are applied to the pedal of a velocipede. In this modification the construction of the bearings is substantially like that shown in Fig. 1, except that the conical seats are formed in the sleeves P P', with which the end plates or heads $p$ $p'$ of the pedal are provided. The pedal-spindle R is provided with a fixed cone $r$ and an adjustable cone $r'$, surrounded by collars having ball-grooves $r^2$ $r^3$, and the end plates $p$ $p'$ are provided in their outer sides with corresponding grooves $s$ $s'$, in which the balls $t$ $t'$ are arranged.

By constructing the hub with grooves in its outer faces, as shown, the outer collars are braced on all sides and bending of the axle or spindle is to a great extent prevented.

If desired, both cones may be separate from the spindle and adjustable thereon.

As my improved compound bearings can be manufactured at almost the same cost as ordinary cone-bearings, the machines can be sold without the balls at a reduction and be used with the ordinary cone-bearings until the cones wear out, or until it is convenient for the owner to purchase the balls, which can then be applied and the bearings rendered practically new and equally as efficient as new bearings which are designed as ball-bearings only.

I am aware that combined plain and ball bearings have been applied to the steering-heads of velocipedes, and I do not therefore desire to broadly claim such bearings.

I claim as my invention—

1. The combination, with a spindle provided at opposite ends with plain cones and collars having annular grooves on their inner sides, of a hub surrounding said spindle and provided with plain conical bearings surrounding the cones of the spindle, annular grooves formed in the ends of the hub, and balls or rollers interposed between the grooves of the hub and spindle, substantially as set forth.

2. The combination, with a spindle provided at one end with a fixed cone and at its opposite end with an adjustable cone, and at both ends with collars having annular grooves on their inner sides, of a hub surrounding said spindle and provided with plain conical bearings surrounding the cones of the spindle, annular grooves formed in the ends of the hub, and balls arranged between the grooves of the hub and spindle, substantially as set forth.

Witness my hand this 27th day of September, 1887.

ADRIAN C. LATTA.

Witnesses:
M. W. POTTER,
FRED N. RICE.